United States Patent [19]

Oshima et al.

[11] Patent Number: 5,210,411
[45] Date of Patent: May 11, 1993

[54] DETECTION MARK AND METHOD AND APPARATUS FOR DETECTING MARK

[75] Inventors: Toshio Oshima, Osaka; Masato Nishida, Kyoto; Tsunemi Ohiwa, Osaka; Tsutomu Yamaguchi, Takatsuki, all of Japan

[73] Assignee: Hitachi Maxell, Ltd., Osaka, Japan

[21] Appl. No.: 722,186

[22] Filed: Jun. 27, 1991

[30] Foreign Application Priority Data

Jun. 29, 1990 [JP] Japan ................................ 2-173655
Jul. 4, 1990 [JP] Japan ................................ 2-178207
Oct. 19, 1990 [JP] Japan ................................ 2-282881

[51] Int. Cl.⁵ .............................................. G06K 7/12
[52] U.S. Cl. ................................... 250/271; 235/463; 235/468; 235/473; 235/491; 250/458.1; 250/459.1; 250/461.1
[58] Field of Search ............... 250/271, 459.1, 458.1, 250/461.1, 341; 235/491, 473, 468, 463

[56] References Cited

U.S. PATENT DOCUMENTS 4,202,491 5/1980 Suzuki ........................... 235/491
4,783,166 11/1988 Stern ............................... 356/36
4,983,817 1/1991 Dolash et al. ................... 235/462

FOREIGN PATENT DOCUMENTS 54-33634 3/1979 Japan ............................... 235/491
2095822 10/1982 United Kingdom ............. 250/271

OTHER PUBLICATIONS

F. J. Bealle, "Read Head." *IBM Technical Disclosure Bulletin*, vol. 18, No. 3 Aug. 1975 p. 659.

*Primary Examiner*—Constantine Hannaher
*Attorney, Agent, or Firm*—Birch, Stewart, Kolasch & Birch

[57] ABSTRACT

A detection mark comprising a pattern formed from a thin phosphor layer which emits a light having a different wavelength from that of an excitation light irradiated on a surface side of the phosphor layer, and an undercoat layer which is formed on a rear surface side of the phosphor layer and reflects the excitation light, which mark can be detected by intermittently irradiating the excitation light to the mark and reading a light or afterglow from the phosphor layer.

8 Claims, 14 Drawing Sheets

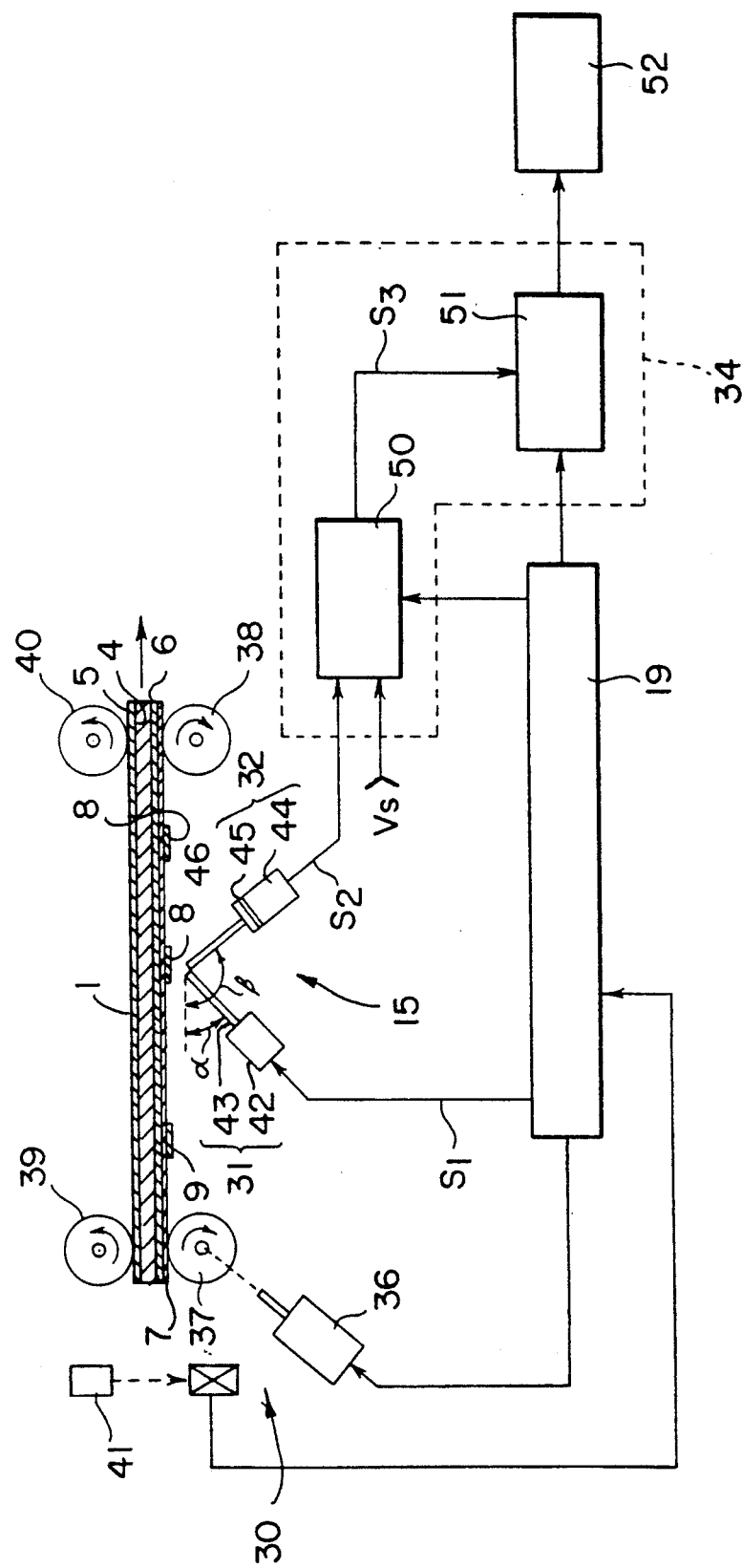

DETECTION MARK AND METHOD AND APPARATUS FOR DETECTING MARK

BACKGROUND OF THE INVENTION

1. Field of the Invention

The present invention relates to a detection mark and a method and an apparatus for detecting a mark. More particularly, the present invention relates to a detection mark which is suitable for a prepaid card such as a passage fee card or a telephone card and a method and an apparatus for detecting such mark.

2. Description of the Related Art

In general, a detection mark is printed on a substrate such as a prepaid card with a black ink. From such detection mark, an information is read by irradiating the black ink mark and detecting variation of reflected light by utilizing a difference of reflectance between a printed part and a non-printed part.

In another method, a detection mark is formed from a phosphor, and an information from the mark is read by selectively detecting an emission emitted from the mark through an optical filter by utilizing a difference of wavelength between the emission and a reflected excitation light from the phosphor (see Japanese Patent Kokai Publication No. 9600/1978).

In a further method, on a printed paper such as a catalog, is printed a mark such as a bar code comprising a photoluminescence layer containing a phosphor which emits light in an infrared wavelength range, whereby informations such as properties and prices of printed materials are easily detected without interfering printed matters (see Japanese Patent Publication Nos. 22326/1979 and 18231/1986).

However, by the method comprising reading the information from the mark by utilizing the reflected light, contaminations or damages of a recorded surface carrying the mark will significantly decrease an intensity of the reflected light, so that the information may be misread.

Though the method comprising reading the informations from the mark by utilizing the emission from the phosphor is resistant to the contaminations of the recorded surface, it is difficult to detect the emission with complete separation from the excitation light since center wavelengths of the emission and the excitation light are very close to each other, so that the reflected light is overlapped over the detected light and a detection accuracy tends to be decreased.

Further, with the bar code comprising the phosphor layer formed on the printed paper, it is known that read errors occur at a high probability.

SUMMARY OF THE PRESENT INVENTION

One object of the present invention is to provide a detection mark which can decrease a reading error.

Another object of the present invention is to provide a detection mark which provides an improved detection accuracy when the mark is formed on an undercoat layer having an ununiform reflectance profile.

A further object of the present invention is to provide a method for detecting a mark with improved accuracy.

A yet further object of the present invention is to provide an apparatus for detecting a mark comprising a bar code with improved accuracy.

According to a first aspect of the present invention, there is provided a detection mark comprising a pattern formed from a thin phosphor layer which emits a light having a different wavelength from that of an excitation light irradiated on a surface side of said phosphor layer, and an undercoat layer which is formed on a rear surface side of said phosphor layer and reflects said excitation light.

According to a second aspect of the present invention, there is provided a method for detecting a mark, which method comprises steps of:

irradiating an excitation light on a mark formed from a material having an afterglow property, and selectively detecting an afterglow from said irradiated material of said mark.

According to a third aspect of the present invention, there is provided an apparatus for detecting a mark, which comprises means for irradiating an excitation light on a mark comprising a phosphor layer which moves relative to said light, and means for selectively receiving a light emitted from a part of said mark irradiated by said excitation light, which detecting device is provided adjacent to said means for irradiating said excitation light, wherein optical axes of said means for irradiating said excitation light and said means for detecting said afterglow are placed on a plane perpendicular to a direction in which said mark moves with said axes being inclined from each other.

BRIEF DESCRIPTION OF THE DRAWINGS

FIG. 7 shows an electrical block diagram of a mark-reading assembly.

DETAILED DESCRIPTION OF THE DRAWINGS

The present inventors have studied causes for the drawbacks of the above mentioned prior art and found that an emission intensity from the phosphor layer unexpectedly depends greatly on the reflectance of an undercoat layer on which the phosphor layer is formed, and that when the reflectance of the undercoat layer is adjusted above a certain value, the emission intensity from the phosphor layer increases and a sufficient difference is achieved between detection voltages obtained from the phosphor layer and the undercoat layer, so that the read error of the mark can be decreased.

Figure 1:
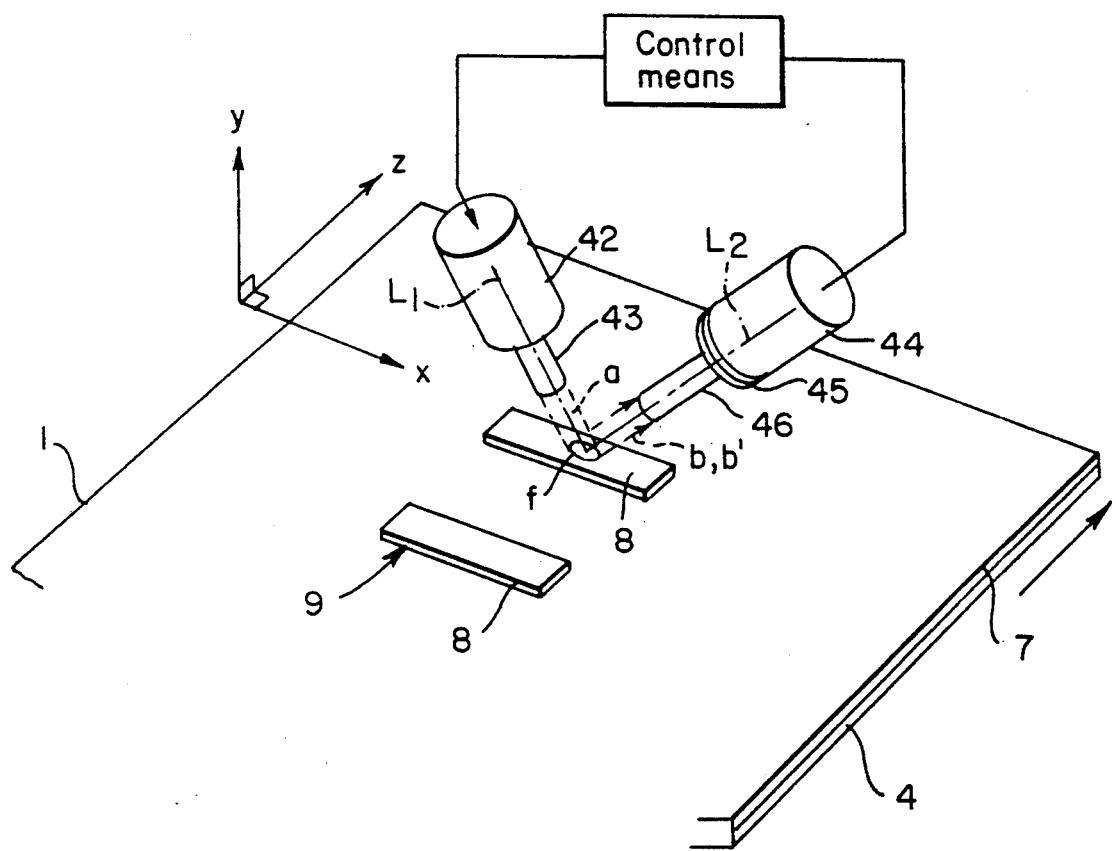
FIG. 1 illustrates a device for detecting a mark according to the present invention.

As shown in FIG. 1, for example, on a substrate 4 made of a white polyester film containing a white pigment, an undercoat layer 7, which will be explained in detail below, is coated and, on the undercoat layer 7, a mark 9 such as a bar code is formed from a phosphor layer 8 which emits a light b having a wavelength of 100 nm different from an irradiated excitation light a having a wavelength of 800 nm. Then, the light b is detected by a detecting device equipped with an optical filter 45 which shields the excitation light a, and an output voltage from the detecting device is read by a control device.

For evaluation, used were four kinds of the undercoat layers 7 having different reflectances against the center wavelength of 800 nm of the excitation light, namely, the substrate 4 itself (an undercoat layer A) (a reflectance of about 78% against the excitation light wavelength), a white undercoat layer B comprising titanium oxide powder (a reflectance of about 39%), a silver undercoat layer C comprising aluminum powder (a reflectance of about 34%), and a black undercoat layer D comprising magnetic powder (a reflectance of about 5%). On each of the undercoat layers, a phosphor layer 8 of $Li(Nd_{0.9}Yb_{0.1})P_4O_{12}$ was formed with varying its thickness from 0 to 200 $\mu$m, and an output voltage from a light detecting device was measured. The results are shown in FIG. 2.

When the afterglow b' from the mark 9 is used for reading, only the intensity of the afterglow of the light b emitted from the phosphor layer 8 is detected. However, when the light b generated by the excitation light a is directly read, a ratio of the output voltage from a part consisting of the undercoat layer 7 to that from a part having the phosphor layer 8 is important. According to experiments, such ratio should be at least about 1.6. The lower limit for each undercoat layer A, B, C or D is shown by a line A', B', C' or D', respectively.

Then, an intersect of each curve and the corresponding minimum line is at 0.4 $\mu$m for the undercoat layer A, 2 $\mu$m for the undercoat layer B, 3 $\mu$m for the undercoat layer C, or 5 $\mu$m for the undercoat layer D. Then, for each kind of the undercoat layer, when the minimum thickness of the phosphor layer 8 is at least this value, a minimum required output voltage is obtained if the undercoat layer 7 has a uniform reflectance.

Figure 2:
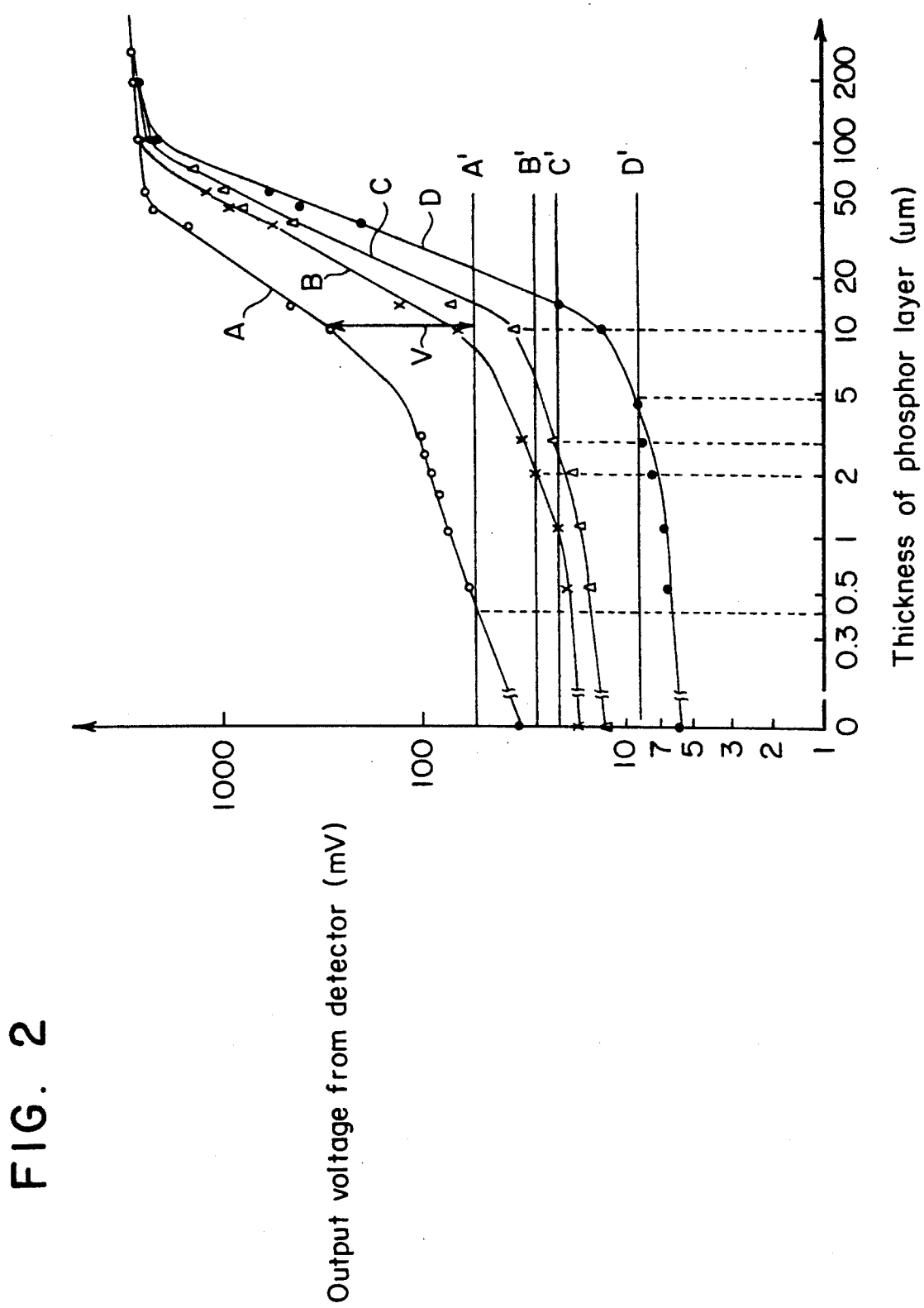
FIG. 2 is a graph showing a relationship between an output voltage of a detector and a film thickness of a phosphor layer with using a reflectance of an undercoat layer as a parameter.

In a case where the reflectance of the undercoat layer 7 varies from part to part such as on a printed material, when the phosphor layer 8 is formed at a thickness of 10 $\mu$m and a part having the largest reflectance is the undercoat layer A, the output voltage should be in the range "v" in FIG. 2 above the A' line in order to separately detect the reflected light from the undercoat layer 7 and the light emitted from the phosphor layer 8. The undercoat layer B satisfies this requirement, while the undercoat layer C does not. Then, the undercoat layer should have a reflectance of at least about 39%.

Figure 3:
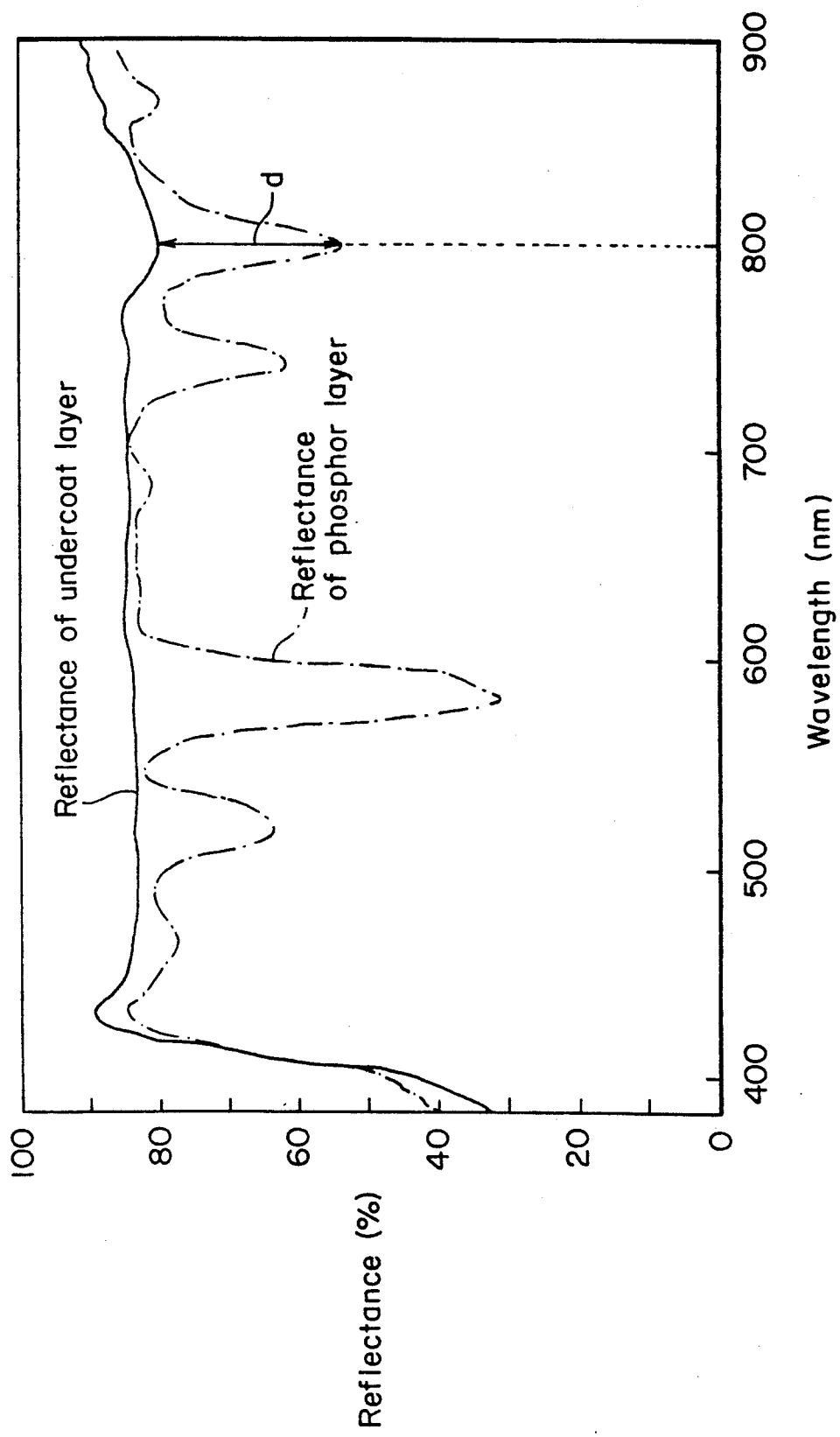
FIG. 3 is a graph showing a change of a reflectance on a card surface against a change of a wavelength of a light source.

With the above four kinds of the undercoat layers, at the part of the undercoat layer 7 only and at the part having the phosphor layer 8, change of the reflectance was measured with varying the wavelength of the light source from 400 nm to 900 nm. FIG. 3 shows the result for the combination of the undercoat layer A and the phosphor layer having a thickness of 35 $\mu$m.

Figure 4:
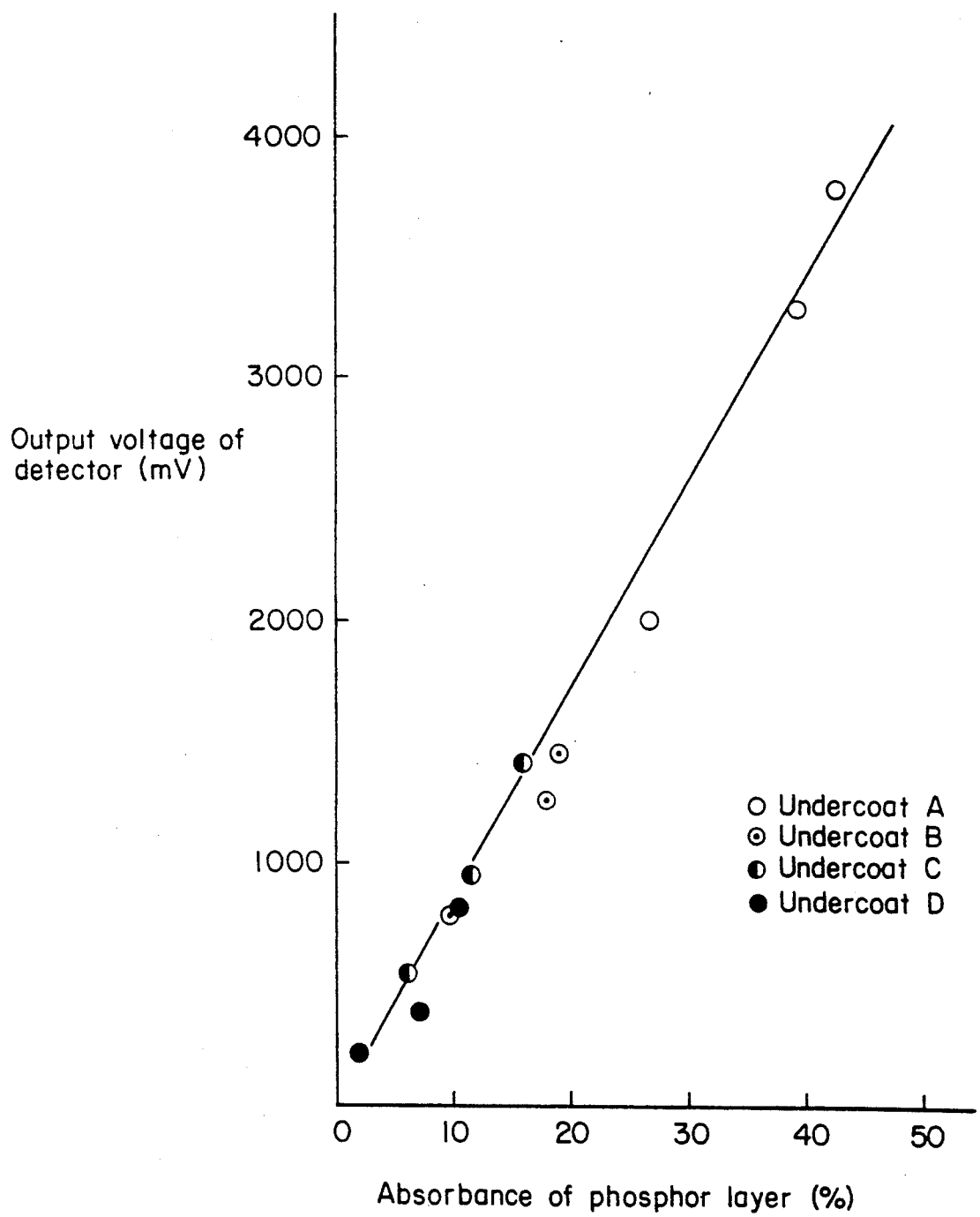
FIG. 4 is a graph showing a relationship between an output voltage of a detector and an absorbance of a phosphor layer.

If a decreased amount "d" of the reflectance due to the presence of the phosphor layer 8 at the excitation light wavelength of 800 nm is regarded as an "absorbance" of the phosphor layer 8, the relationship between the absorbances for the undercoat layers A to D and the output voltage from the detecting device is shown in FIG. 4.

From the above experiments, it is understood that the output voltage from the detecting device is substantially proportional to the "absorbance" of the phosphor layer 8, and that the absorbance of the phosphor layer 8 greatly depends on the reflectance of the undercoat layer 7 and the thickness of the phosphor layer 8.

The present invention has been completed based on the above findings.

As seen from the fundamental structure shown in FIG. 1, the detection mark 9 of the present invention comprises the thin phosphor layer 8 formed on the undercoat layer 7, and the emitted light b or the afterglow b', which is generated in accordance with the irradiated excitation light a and has a different wavelength from the center wavelength of the excitation light a, is selectively read. The detection mark 9 is characterized in that the reflectance of the undercoat layer 7 with the center wavelength of the excitation light a is defined at a value above a predetermined minimum value.

When the phosphor layer 8 is formed on the undercoat layer having a uniform reflectance profile, the thickness of the phosphor layer is selected from a range from 0.5 to 200 $\mu$m, the reflectance of the undercoat layer 7 is adjusted so that a ratio of the output voltage which is obtained through photoelectric transfer of the selectively detected light b to that of the reflected light c from the undercoat layer 7 is at least about 1.6 when they are measured under substantially the same conditions.

When the phosphor layer 8 is formed on the undercoat layer 7 having the uneven reflectance profile, the thickness of the phosphor layer is selected from a range from 0.5 to 200 $\mu$m and also the reflectance of the undercoat layer 7 is adjusted so that a ratio of the minimum value of the output voltage which is obtained through photoelectric transfer of the selectively detected light b to the reflected light c from a part of the undercoat layer 7 having the maximum reflectance is at least about 1.6 when they are measured under substantially the same conditions.

The method for detecting the mark according to the present invention comprises steps of irradiating the mark 9 comprising the material having the afterglow property with the excitation light a and independently detecting the afterglow b' emitted from the irradiated mark 9.

In the present invention, it is possible to intermittently turn off the excitation light a which is irradiated on the mark 9, and to detect the afterglow b' in connection with an off-time of the excitation light a. Preferably, the off-time $T_2$ is shorter than an on-time $T_1$.

The irradiation step of the excitation light a and the detecting step of the afterglow b' may be carried out with shielding one of them from the other, and the mark 9 may be moved from the irradiation side to the detection side.

The mark detecting device according to the present invention comprises means for irradiating the excitation light a on the mark 9 comprising the phosphor layer while moving relative to the light a, and light detecting means which is provided adjacent to the irradiating means and selectively reads the light b or the afterglow b' emitted from a focus point f of the excitation light a.

The optical axis $L_1$ of the irradiation means and that $L_2$ of the detecting means are present in a common plane in parallel with the x-y plane which is in perpendicular to the direction in which the mark 9 moves, namely the z axis, and these optical axes incline from each other.

In a preferred embodiment, the mark 9 is formed in the form of thin strips extending in parallel with the direction x which is perpendicular to the mark moving direction z, and the phosphor layer 8 of the mark 9 is capable of emitting the farinfrared region light b having a different center wavelength from that of the excitation light a when the excitation light a in the infrared region is irradiated on the phosphor layer 8. Further, the light irradiation means comprises an optical guide 43 having a specific length extending from an emitting surface of a light emitting element 42, and the detecting means has an optical guide 46 which is connected to a light-receiving surface of a light-receiving element 44 through an optical filter 45.

In the above construction, since the lower limit of the reflectance of the undercoat layer 7 is defined, the intensity of the emitted light b or the afterglow b' emitted from the phosphor layer 8 when the excitation light a is irradiated on the phosphor layer 8 can be kept sufficiently high.

Since the refelctance profile of the undercoat layer 7 is uniform, and a ratio of the intensity of the emitted light from the phosphor layer 8 to that from the undercoat layer 7 is at least about 1.6 after photoelectric transfer, a boundary between the undercoat layer 7 and the phosphor layer 8 is clearly detected.

When the phosphor layer 8 is formed on an undercoat layer 7 having an uneven reflectance profile, and a ratio of the intensity of the emitted light from the phosphor layer 8 which is formed on a part of the undercoat layer 7 having a comparatively low reflectance to the intensity of the reflected light from a part of the undercoat layer 7 having the highest reflectance is at least about 1.6 after the photoelectric transfer, it is possible to prevent misreading of output variation of the intensity of the emitted light from the phophor layer 8 due to the uneven reflectance profile of the undercoat layer as the variation from the boundary between the phosphor layer 8 and the undercoat layer 7.

When the irradiation of the excitation light a is stopped or shifted from the mark 9 after exciting the mark having the afterglow property, only the afterglow b' is emitted from the mark 9 while no reflected component c of the excitation light a disappears. The detection of the afterglow b' makes it possible to read only the signal corresponding to the position of the mark 9 irrespective of closeness of the center wavelengths of the excitation light a and the afterglow b'.

When the detecting means outputs a control signal to the irradiation means through a control means, the irradiation means irradiates the excitation light a onto the mark 9. Since the optical axes $L_1$ and $L_2$ of the excitation light a and the emitted light b or the afterglow b' are present on the plane in parallel with the direction in which the mark 9 extends and are inclined from the surface of the mark 9 and the excitation light and the emitted light b or the afterglow b' have the focus points at the same point f, expansion of the light in a width direction of the phosphor layer 8 on the mark 9 is confined within a diameter of the excitation light just after irradiated from the irradiation means, so that a definition along the moving direction of the mark 9 is kept high.

PREFERRED EMBODIMENTS OF THE INVENTION

Figure 5:
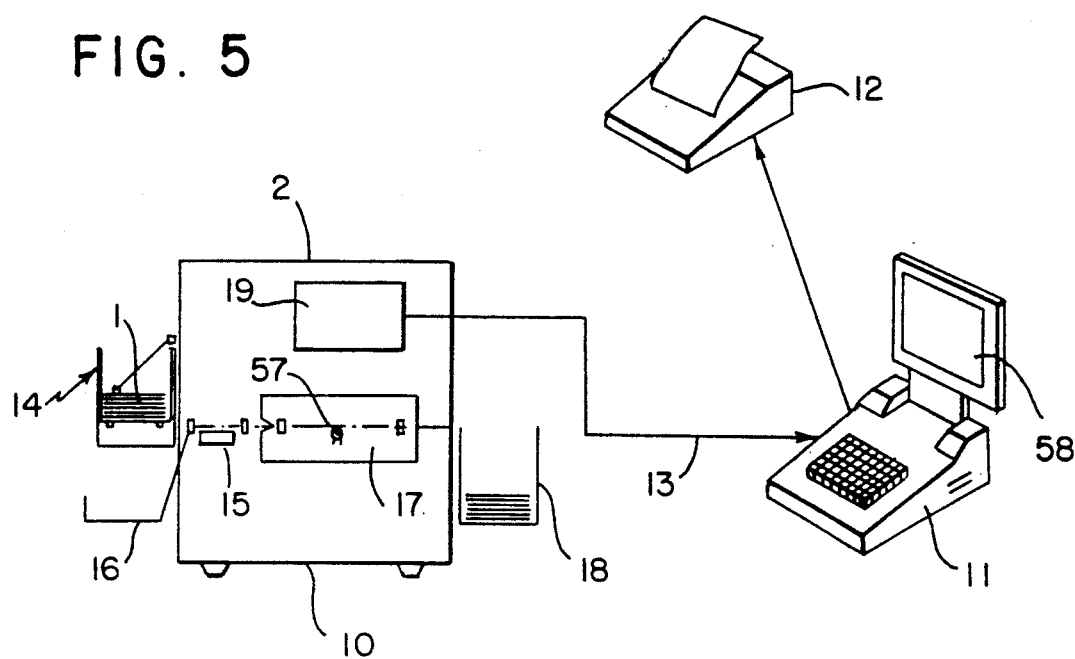
FIG. 5 shows a card reader-writer system which utilizes the present invention.

The present invention will be illustrated by making reference to a card 1 on which data are recorded and a card reader-writer 2 of FIG. 5 which processes the data recorded on the card 1. This example does not limit the scope of the present invention.

Card

Figure 8:
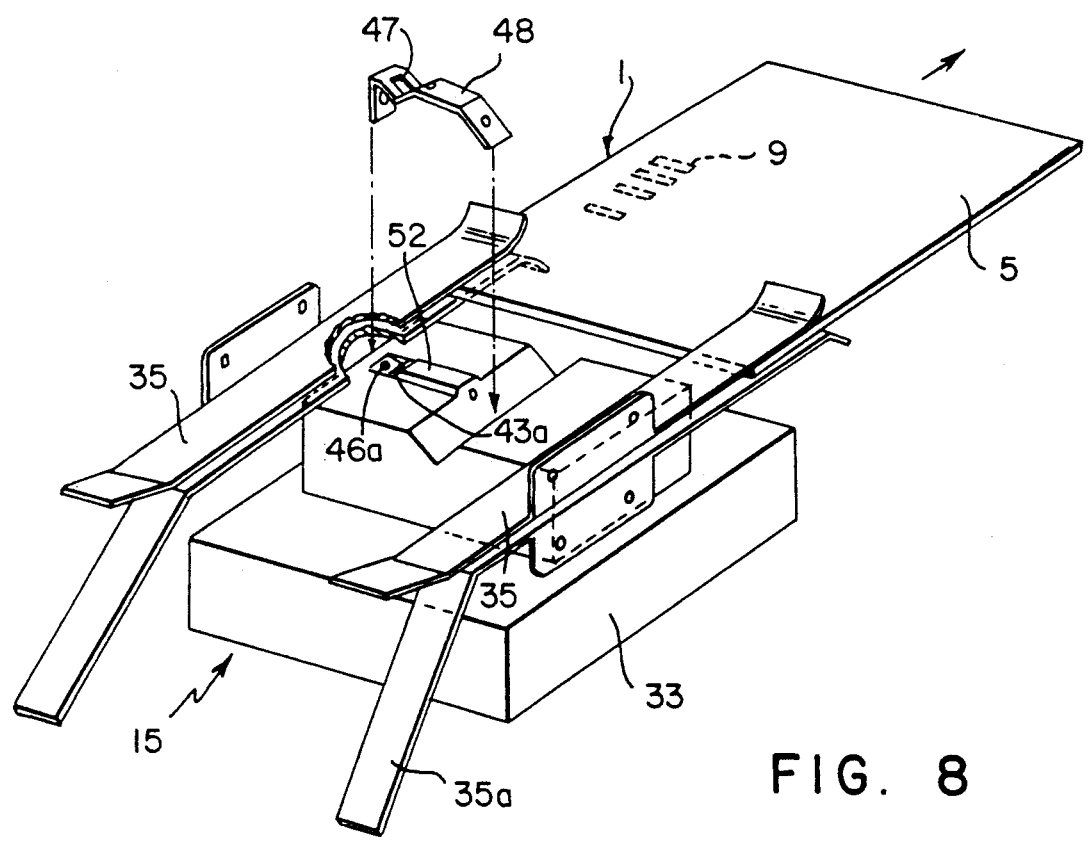
FIG. 8 is an exploded perspective view of a main portion of a mark-reading assembly.

As shown in FIGS. 7 and 8, the card 1 comprises a substrate 4 having a length of about 5.5 cm, a width of about 8.5 cm and a thickness of about 188 μm and made of a white polyester film containing a white pigment. On an upper surface of the substrate 4, a certain design 5 is printed by substantially the same manner as in the conventional card, while on a lower surface of the card 4, a magnetic paint is coated to form a magnetic layer 6 which can reloadably record main informations.

According to the present invention, in addition to the above structures, the card has the undercoat layer 7 having an adjusted reflectance on the magnetic layer 6, and on the undercoat layer 7, the mark 9 of the phosphor layer 8 is printed so as to make it possible to fix sub-informations for security purpose.

The undercoat layer 7 was formed by dispersing 50 parts by weight of aluminum powder and 50 parts by weight of a polyester resin (Vilon 280 manufactured by Toyobo) in 200 parts by weight of methyl ethyl ketone in a ball mill for 48 hours to prepare an undercoat paint, coating the paint on the magnetic layer 6 and drying it to form the undercoat layer 7 having a uniform thickness of about 4 μm.

The mark formed on the undercoat layer 7 consists of the phosphor layer 8 which emits the infrared light b having a different center wavelength from that of the excitation light a when the excitation light a in the infrared region is irradiated. In this embodiment, a bar code mark 9 in the form of strips which are perpendicular to the longitudinal direction of the card 1 is formed to record the subinformation for security purpose such as a code of a card supplier or a secret identification number.

The phosphor layer 8 formed by mixing a phosphor powder with a UV light-curable resin or dispersing a phosphor powder in a solvent together with a binder resin to prepare a phosphor paint, coating the paint on the undercoat layer and then drying it. The phosphor powder comprises, as an emission center, a rare earth metal element (e.g. neodymium (Nd), ytterbium (Yb), europium (Eu), thulium (Tm), praseodymium (Pr), dysprosium (Dy), etc.) or mixtures thereof and, as a matrix, an oxide (e.g. molybdate salts, tungstate salts, etc.). Examples of the binder resin are vinyl chloride-vinyl acetate copolymers, polyurethane resins, polyester resins, alkyd resins and the like. Examples of the solvent are methyl ethyl ketone, tetrahydrofuran, ethylcellosolve acetate and the like.

For example, a phosphor paint containing a phosphor such as $Li(Nd_{0.9}Yb_{0.1})P_4O_{12}$ is screen printed on the undercoat layer. When the excitation light having the wavelength of 800 nm in the near infrared region is irradiated, the phosphor layer emits the infrared light b having a peak near the wavelength of 1000 nm, and after the irradiation is stopped, the phosphor layer generates the afterglow b' having a damping time from 90% to 10% of 400 to 600 microseconds.

To emit the light b having the sufficient intensity when the excitation light a is irradiated, a weight ratio of the phosphor powder to the binder resin is preferably from 1:2 to 2:1.

A thickness of the phosphor layer 8 is from 0.5 to 200 $\mu$m. To obtain a stable output, the thickness is preferably at least 1 (one) $\mu$m. To achieve durability, the thickness is not larger than 100 $\mu$m.

As shown in FIG. 5, the card reader-writer 2 comprises a card reader-writer main body 10, a personal computer 11 which will input necessary data to the main body 10 and a printer 12 which indicates a writing condition of the card 1.

That is, in the personal computer 11, information such as the number of the cards to be issued, codes of issuing offices, kinds of money, an issuing time and the like are stored through a key board. The personal computer 11 and the card reader-writer main body 10 are connected by a serial line 13 of the RS-232 C standard. When the stored data are transferred to the card reader-writer main body 10, the main body automatically writes the main information on the card 1 based on the received informations.

The card reader-writer main body 10 has a one-tip microcomputer for control which operates by itself based on the received informations, and comprises a card supplier 14 which ejects stacked cards 1, 1,—one by one, a mark-reader 15 which reads the sub-information from the supplied card 1 and judges whether the card is good or not, a rejected card-discharging unit 16 which discharges the cards which are judged as "no good", a card data-processor 17 which writes and reads the main information of the card 1, a good card receiving box 18 for receiving the cards 1 on which the main information have been written, and a control section 19 which sends control signals to the above parts.

Figure 6:
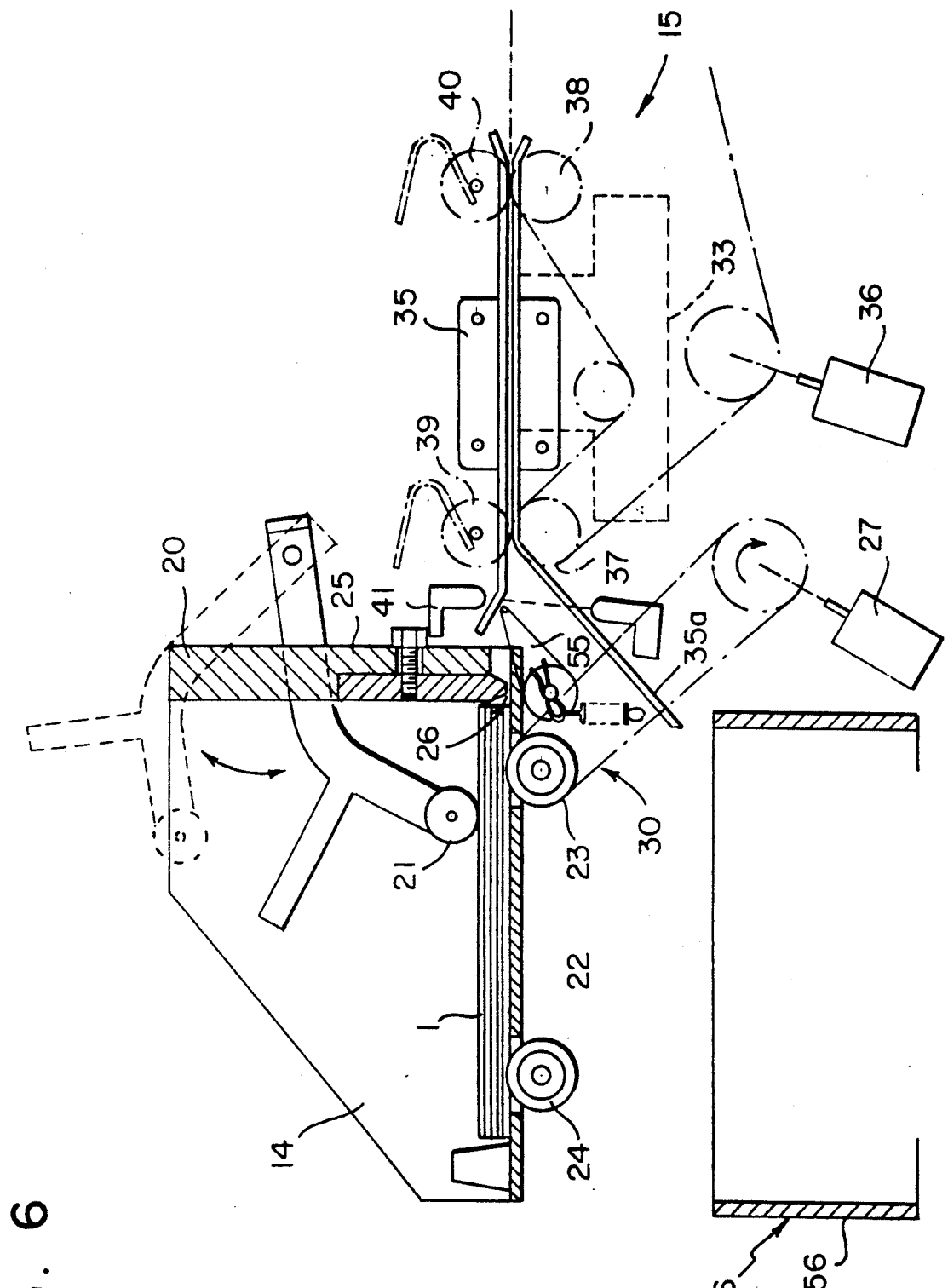
FIG. 6 shows a mechanical construction of a mark-reading assembly.

As shown in FIG. 6, the card supplier 14 has a counter weight 21 which swings up and down and applies a predetermined weight vertically on the stacked cards 1, at an upper part of a guiding frame 20 in which cards 1 are horizontally stacked with the surfaces having the marks 9 facing downwards. Also, the card supplier 14 has card-ejecting rollers 23 and 24 top parts of which slightly protrude above the level of a bottom plate 22 of the guiding frame 20 and a slit 26 a width of which is precisely controlled and through which only one card 1 can pass at one time on the same level as the bottom plate 22 on the side of a front wall 25 of the guiding frame 20. Further, the card-ejecting roller 23 on the slit side is driven by a motor 27, which is actuated in accordance with the input of the actuating signal from the control section 19, whereby the lowest card 1 which is in contact with the roller 23 is slidingly shifted towards the slit 26 and conveyed toward the mark-detector 15 with the mark 9 facing downwards.

The present invention is characterized by the structure of the mark-detector 15. As schematically shown in FIGS. 6 and 7, the mark-detector 15 comprises drive means 30 which horizontally conveys the card 1 with the mark 9 facing downwards, a detecting head 33 which is provided below the card conveying plane and integrally contains a light source 31 which intermittently irradiates the excitation light a onto the mark 1 formed on the card 1 and a detector 32 for detecting the afterglow b' emitted from the mark 9 when the light source 31 is turned off, and a detection circuit 34 which processes signals outputted from the detector 32.

As shown in FIGS. 6, 7 and 8, the drive means 30 of the card 1 has a pair of guiding rails 35, 35 which hold respective edges of the card 1 and are fixed in parallel with each other along the traveling passage, and each one set of a driving roller 37 or 38 and a pressing roller 39 or 40 at an entrance and an exit of the mark-detector 15, respectively. In addition, at the entrance of the mark-detector 15, an interrupter 41 is provided and, when it detects the supply of the card 1 from the card-supplying part 14, it actuates the motor 36 to normally rotate, whereby the card 1 is horizontally conveyed at a constant rate of 200 to 400 mm/sec., and then the bar code type mark 9 formed from the phosphor layer 8 on the lower surface of the card 1 passes over the light source 31 and the detector 32 successively.

Figure 9:
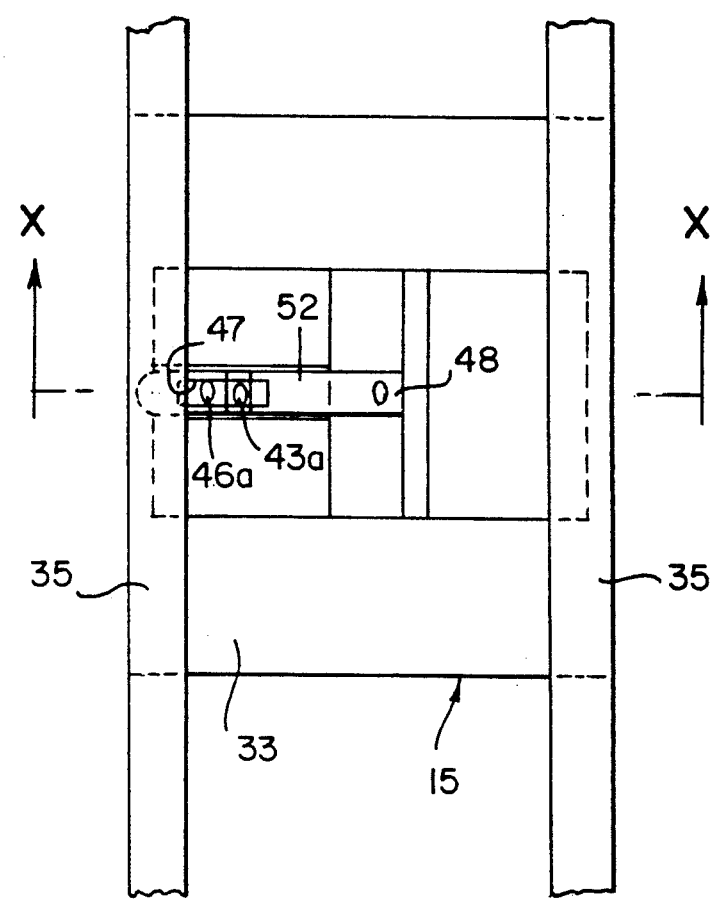
FIG. 9 is a top planar view of a mark-reading assembly.
Figure 10:
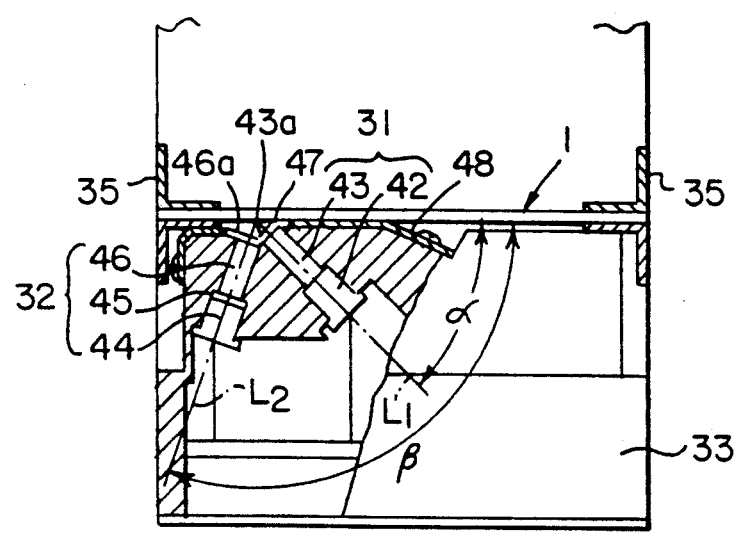
FIG. 10 is a cross sectional view along the line X—X of FIG. 9.

As shown in FIGS. 9 and 10, the light source 31 comprises a light emitting element 42 such as a light emitting diode which emits a near infrared light having a center wavelength of around 800 nm and an optical guide 43 made of a glass fiber having a diameter of 3.0 mm and a length of 7.0 mm which is attached to a light emitting part of the light emitting element 42. A tip end 43a of the optical guide 43 is positioned close to the surface of the card 1 with a distance of 2 mm or less, and the whole light guide 43 is arranged on a plane in perpendicular to the mark moving direction at an angle $\alpha$ of 45° to 60° from a horizontal plane. In addition, with signals $S_1$ outputted from the control section 19, the light emitting element 42 is turned off and on at substantially equal intervals with the on-time $T_1$ and the off-time $T_2$ both being 500 microseconds, so that the excitation light a intermittently irradiates.

The detector 32 comprises a light receiving element 44 such as a photocell having a receiving sensitivity in an infrared region, and an optical guide 46, which is substantially the same as that of the light source 31, is fixed on a light receiving surface of the light receiving element 44 through an optical filter 45 which selectively permits passage of the afterglow b' emitted from the mark 9. The intensity of the afterglow b' is converted to electrical signals in the light receiving element 44, and signals corresponding to the mark 9 are generated in the detection circuit 34. In this case, the mark moves by 0.2 mm or less during the irradiation period of the excitation light a from the light source 31 is irradiated onto the mark 9, and a series of the light irradiation and detection of the afterglow is deemed to be carried out in a substantially stopped state. Then, it is possible to detect the afterglow b' emitted from the irradiated part of the surface of the mark 9 by placing a tip end 46a of the of the light guide 46 on the detector side close to the tip end 43a of the light guide 43 and making an angle $\beta$ of 105° to 115° on the plane in perpendicular to the mark moving direction. Further, the excitation light a is irradiated onto the surface of the mark 9 from a direction as perpendicular as possible to the mark surface and the afterglow b' emitted in a direction perpendicular to the mark surface is detected, whereby a detection efficiency is improved.

In addition, a part 52 of a supporting plate close to the tip end 43a of the light source 31 can be slightly protruded upwardly as shown in FIG. 8, and the protruded part 52 is in contact to the under surface of the card 1, so that a distance between the detection head 33 and the card 1 is kept constant.

Figure 11:
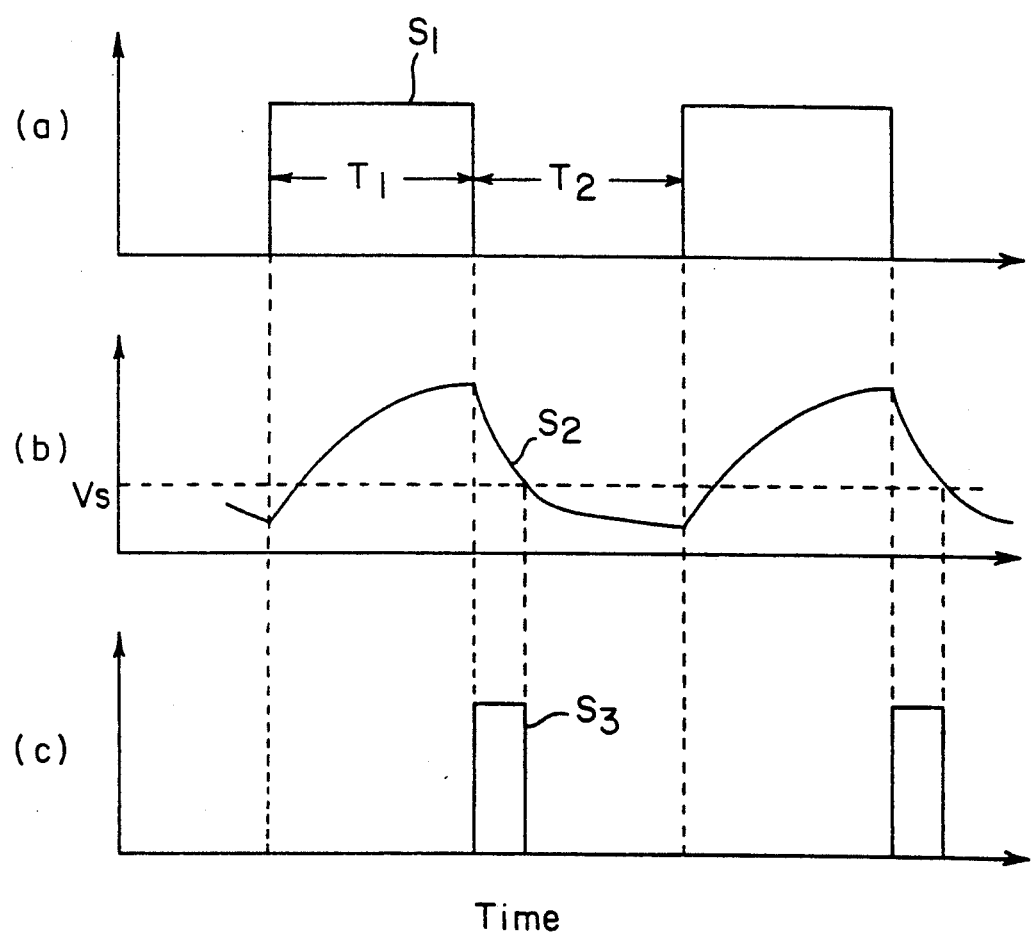
FIG. 11 is a waveform showing procedures for detecting afterglow in a case where an on-time and an off-time of a light source are substantially equal.

When the irradiation of the excitation light a starts, an intensity of a signal $S_2$ inputted in the detection circuit 34 from the light receiving element 44 of the detector 32 increases since, as shown in the graph (b) of FIG. 11, a reflected component c which is not prevented by the optical filter 45 overlaps the emitted light b from the phosphor layer 8, while when the irradiation of the excitation light a is stopped, the intensity $S_2$ decreases exponentially since only the afterglow b' emitted from the phosphor layer 8 remains. Then, the output signal $S_2$ is inputted in a comparing circuit 50 which functions corresponding to the off-time and compared with a preset value $V_s$. Thereby, a rectangular signal $S_3$ is generated corresponding to the position where the mark 1 is formed just after the light emitting element 42 is turned off, and inputted in a judging circuit 51.

Figure 12:
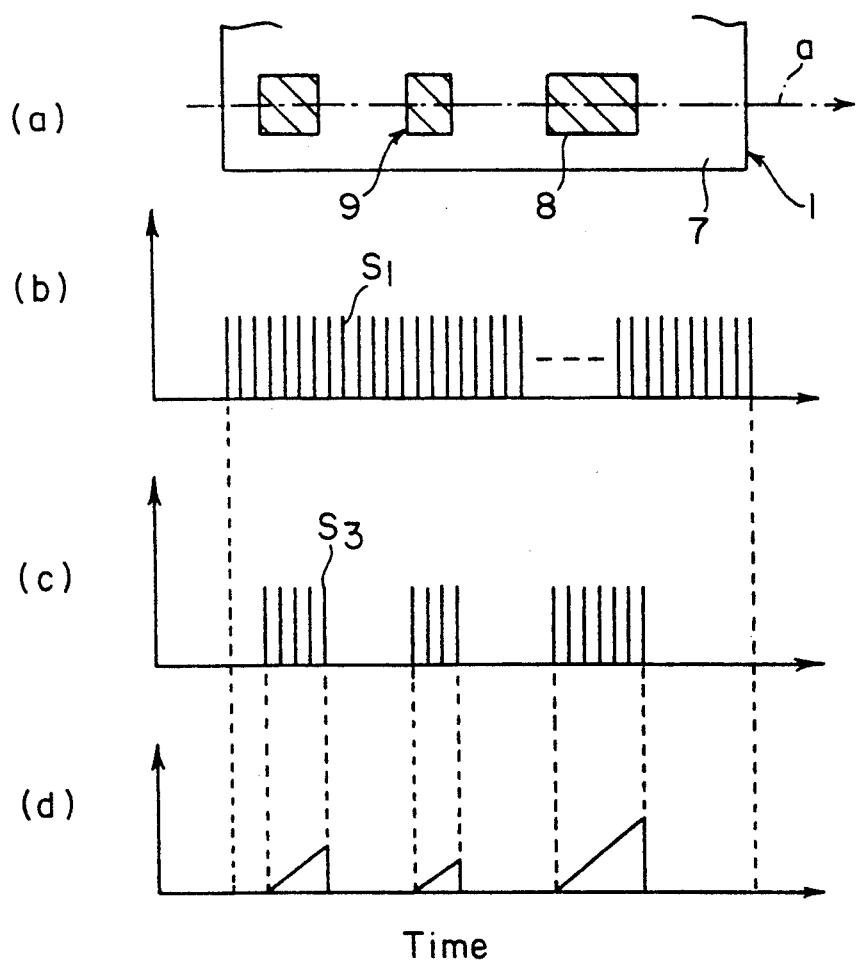
FIG. 12 illustrates an example of mark-reading procedures.

In the judging circuit 51, the presence of the rectangular signal $S_3$ just after turning off the light emitting element 42 is checked, and the number of the rectangular signals $S_3$ which are continuously inputted are accumulated as shown in the graph (d) of FIG. 12, so that a width of the mark 9 in the moving direction of the card 1 is measured. Then, a detected datum is read by comparing a pattern obtained from each width as detected above with an already memorized pattern of a specific bar code, and a result of reading is displayed on a display 52. Simultaneously, when the detected datum is correct, the normal rotation of the motor 36 is continued so as to convey the card to the card data processor 17. However, if the datum is not correct or no datum is read, the motor is reversely rotated so as to exit the card 1 into the rejected card-discharging section 16.

To exit the rejected card, on the exit side of the card supplier 14, a no-return roller 55 which permits only exit of the card 1 from the supplier 14 and a receiving section 56 is provided below the card supplier 14. An edge 35a of the lower guiding rail 35 is downwardly bent towards the receiving section 56. By such constructions, the reversely conveyed card 1 from the mark detection part 15 is discharged in the receiving section 56 via the no-return roller 55 and the guiding rail edge 35a.

On the card 1 which is sent to the card data processor 17, predetermined data are written in the magnetic layer 6 formed on the back side of the card with a magnetic head 57 and discharged in the good card-receiving box 18. Also, the information corresponding to the processing action is fed back to the personal computer 11 and the processed results are displayed on a display 58 and printed by a printer 12.

Other Examples

Figure 13:
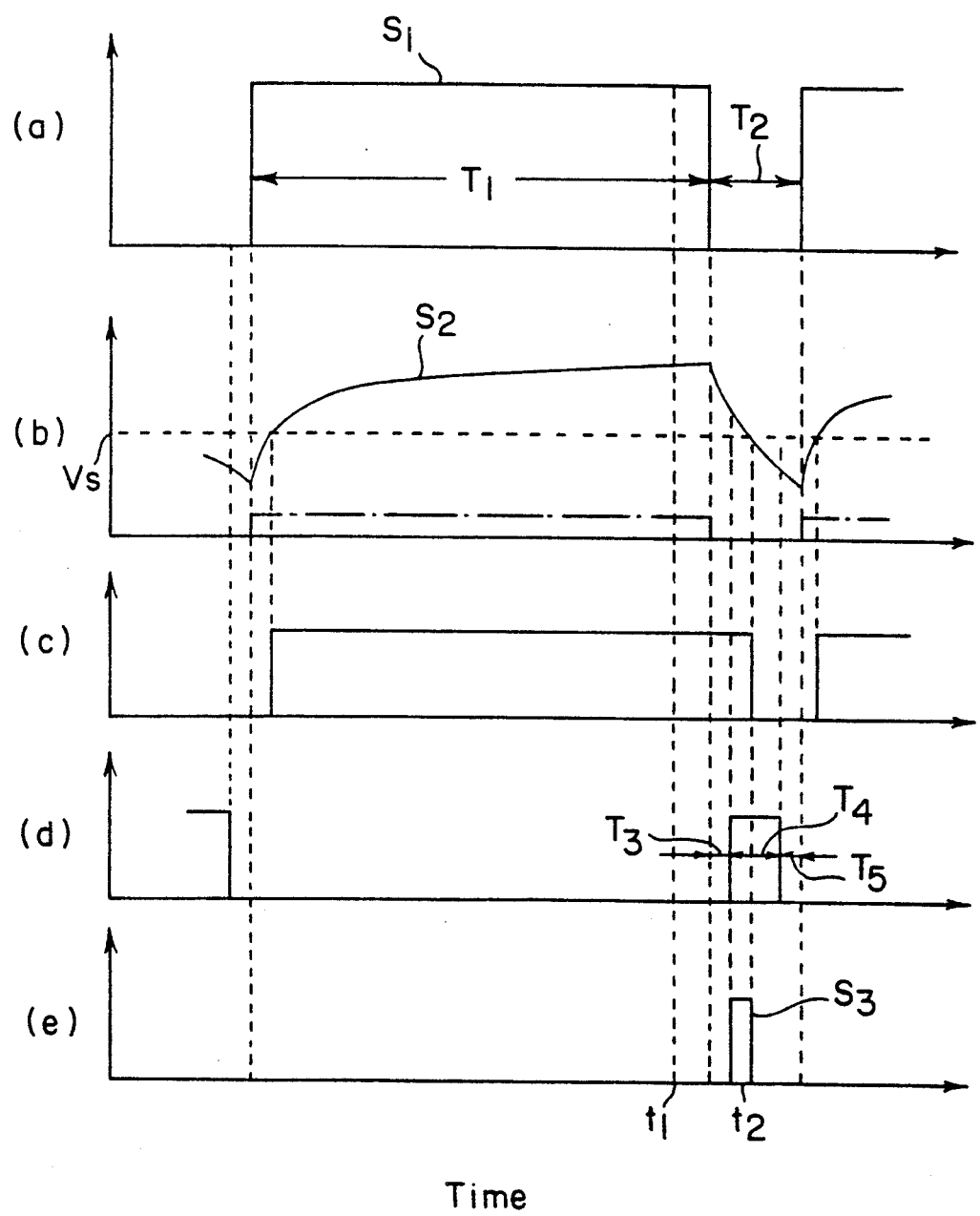
FIG. 13 illustrates another example of mark-reading procedures.

FIG. 13 shows various waveforms in another example of the procedure for detecting afterglow which is analogous to the already explained example in connection with FIG. 11. As seen from the graph (a) of FIG. 13, the on-time $T_1$ of the light emitting element 42 is made long sufficient to excite the phosphor layer 8 of the mark 9, while the offtime $T_2$ is made as short as possible for detecting the afterglow b', whereby a generation period of the excitation light a from the light emitting element 42 is made as short as possible, the number of pulses $S_3$ detected during scanning of one mark 9 is increased and an accuracy of measuring the width of the mark is increased.

In this example, the detected signal $S_2$ corresponding to the light emission from the phosphor layer 8 which is shown by a solid line in the graph (b) of FIG. 13 is compared with the preset value $V_s$, and the detection signal can be generated for a period in which the signal $S_2$ is larger than the preset value $V_s$. However, in this example, as shown by the graph (d) of FIG. 13, a gate time $T_4$ for afterglow detection which is accompanied with detection margin times $T_3$ and $T_5$ is set at substantially the middle of the off-time $T_2$, and a signal $S_3$ is generated as shown in the graph (e) of FIG. 13 from a logical product of the gate time $T_4$ and the signal of the graph (c) of FIG. 13.

The times $T_1$ to $T_5$ may be varied in accordance with the afterglow time of the phosphor layer 8, required accuracy of detection, etc. In the example of FIG. 13, $T_1$ is 500 microseconds, $T_2$ is 20 microseconds, $T_3$ and $T_5$ are each 5 microsecond and the gate time $T_4$ is 10 microseconds.

For comparison, the dashed line in the graph (b) of FIG. 13 represents an output wave from the detector 32 when a part having no phosphor layer 8 is detected.

From the above results, an SN ratio at the time $t_2$ in the detection of the afterglow is about 60 dB, while an SN ratio at the time $t_1$ in the detection of the emitted light is about 13 dB. These results mean that the detection of the afterglow greatly improve the SN ratio.

Figure 14A:
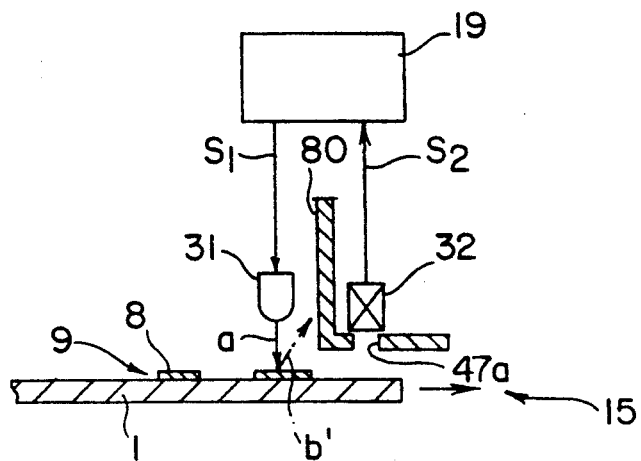
FIG. 14 illustrates a further example of mark-reading procedures.
Figure 14B:
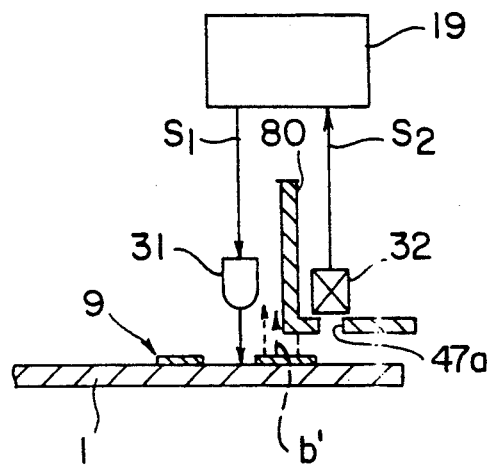
Figure 14C:
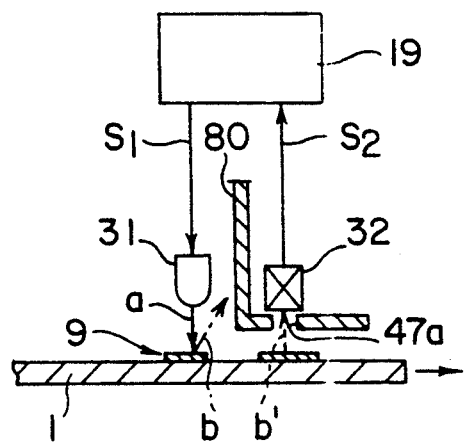

FIG. 14 shows a further example of the mark reader 15. On an upstream of the mark moving direction, the light source 31 is provided, while on a downstream of the mark moving direction, the detector 32 is provided, and the light is shielded by a partition 80.

By such structure, the mark 9 which has been excited by the excitation light a from the light source 31 starts emission of the light b as shown in FIG. 14a, and also the afterglow b' as shown in FIG. 14b even after the mark 9 leaves the light source 31. Among the afterglow b', only the afterglow emitted from the part of the mark 9 which faces the detector 32 through the slit 47a formed in the partition 80 is selectively detected by the detector 32. Other functions are substantially the same as those described above in connection with the previous example.

This structure is effective when the afterglow has still a sufficient intensity when the mark reaches the position of the detector 32 in a case where the mark 9 comprises a phosphor having a long afterglow time or the mark is moved at a sufficiently high speed though the phosphor has a short afterglow time.

When the moving speed of the mark 9 varies greatly, for example, in case of manual movement of the mark 9, both the detectors of FIGS. 1 and 14 are provided and the detectors 32 are switched according to the detected speed of the mark.

Figure 15A:
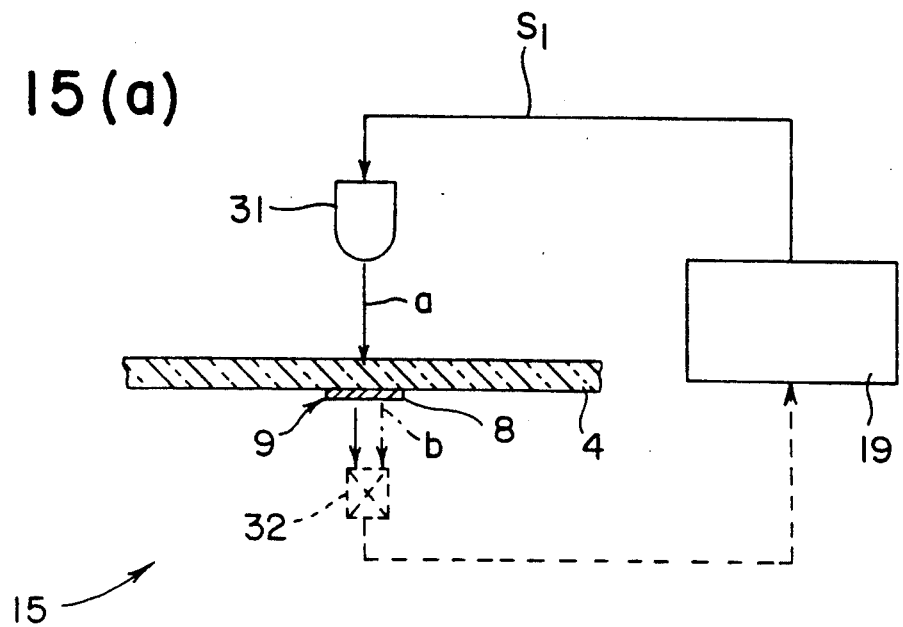
FIGS. 15 and 16 illustrates additional examples of the invention.
Figure 15B:
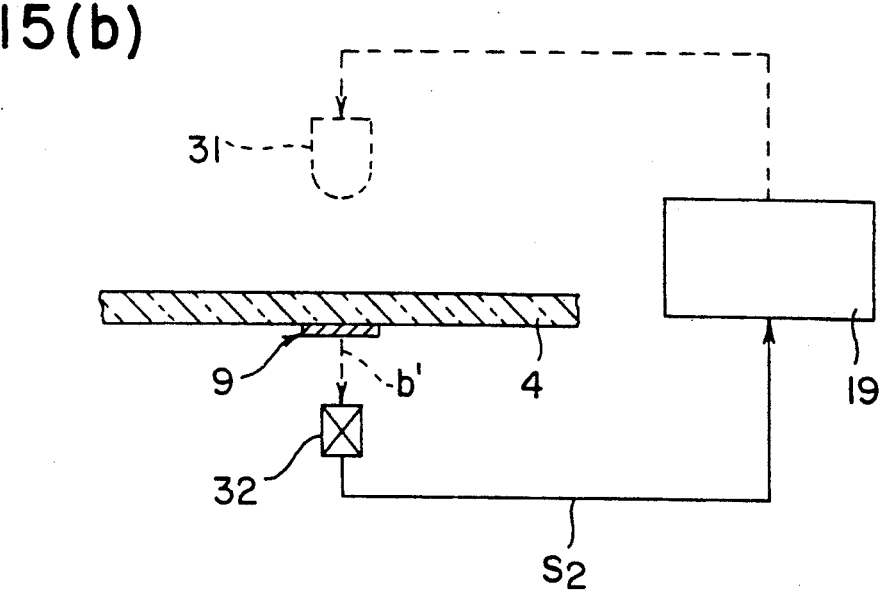

FIGS. 15 and 16 illustrate additional examples. In the example of FIG. 15, the light source 31 and the detector 32 are provided on the different sides of the mark 9, and at least a part of the substrate 4 on which the mark 9 is formed is transparent. By such construction, as shown in FIG. 15a, the excitation light a emitted from the light source 31 passes through the transparent part of the substrate and irradiates the mark 9 so that the mark 9 emits the light. When, in this state, the irradiation by the excitation light a is stopped and the detector 32 is functioned as shown in FIG. 15b, the afterglow b' emitted from the mark 9 is selectively detected by the detector 32.

Figure 16A:
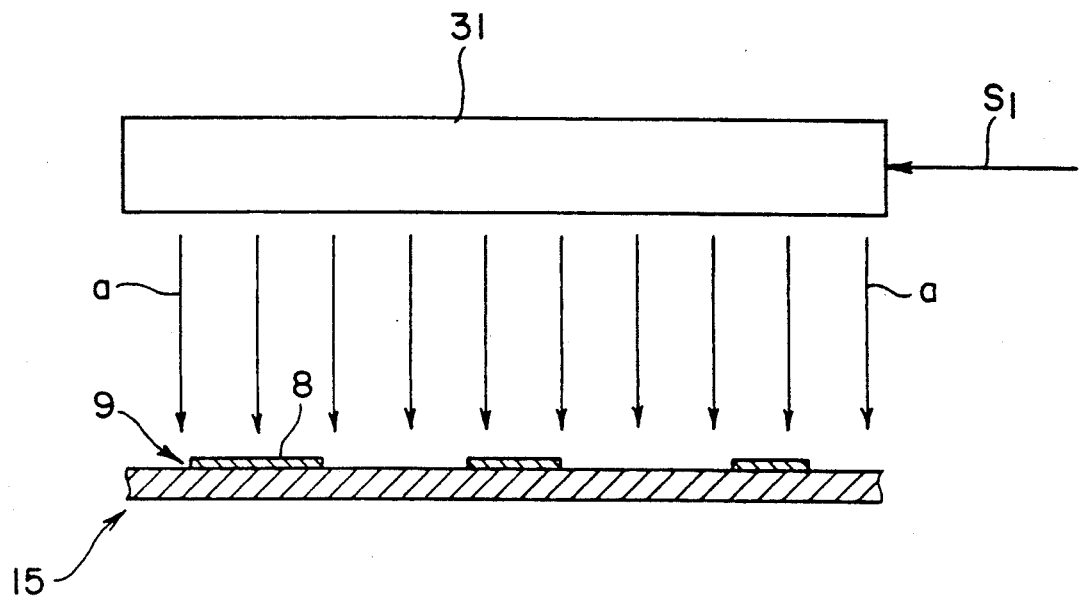
Figure 16B:
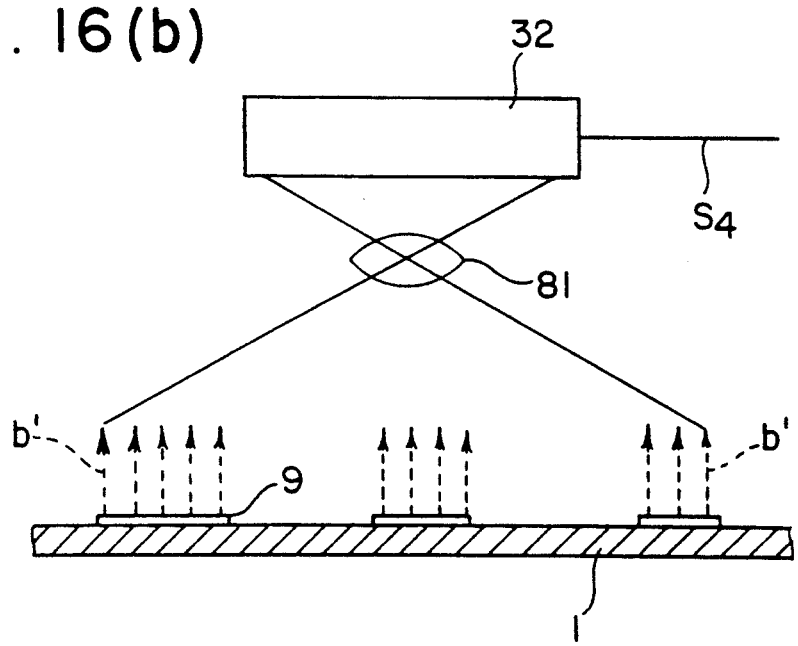

In the example of FIG. 16, the emitted light or afterglow can be detected while the mark 9 is stopped. As shown in FIG. 16a, after all the marks 9 are excited by the light source 31, the light source 31 is turned off as shown in FIG. 16b and the afterglows b' from the marks 9 are inputted in the detector 32 through a lens 81. The detector 32 comprises a one or two dimensional CCD element. An intensity of the afterglow b' just after turning off of the light source 31 is converted and stored according to an intensity of the electrical signal $S_4$, and then the signals $S_4$ stored in series are withdrawn according to the irradiation time.

As the phosphor to be used for the formation of the mark 9, insofar as it has the afterglow property, a compound which emits a visible light may be used by taking the physical properties such as a wavelength of the afterglow and an afterglow time into consideration in a specific application.

Also the wavelength of the light emitted from the light source 31 may be varied according to the kind of the phosphor. If the center wavelengths of the excitation light a and the afterglow b' are greatly different, the present invention may be carried out. But, the present invention is particularly effective when the both center wavelengths are close to each other or the same.

When the mark 9 comprises a transparent phosphor layer 8 which emits the light b and the afterglow b' in the infrared region upon being irradiated by the infrared excitation light a, the mark can be formed on a design 5 printed on the substrate 4 without disturbing the design 5, and the security of the informations in the mark 9 is improved.

In some embodiments, the light source 31 and the detector 32 are arranged in the mark moving direction as in the conventional technique, or the optical guides 43 and 46 are bound together and the light is irradiated and detected in a direction perpendicular to the phosphor layer 8.

Though the above examples detect the mark 9 by utilizing the afterglow b', it is possible to use the light b in substantially the same manner as above.

According to the present invention, since the mark 9 is formed from the phosphor layer 8 on the undercoat layer 7 having a reflectance with the limited lower value, the light emitted from the mark has always a sufficient intensity, so that the detection error is beforehand prevented.

Since the lower limit of the reflectance of the undercoat layer is so adjusted that the ratio of the detection voltage from the phosphor layer 8 to that from the undercoat layer is at least 1.6, the phosphor layer part 8 and the undercoat layer 7 are separately detected so that the detection operation is stabilized.

In addition, when the mark 9 is detected by utilizing the afterglow b' emitted from the mark 9, the influence of the excitation light a is avoided so that the detection is effected with the high SN ratio.

When the afterglow b' is detected with on and off of the excitation light a at a high speed or when the off-time $T_2$ of the light emitting element 42 is made shorter than the on-time $T_1$, the detection is carried out in the state where the damping of the afterglow b' is small, so that the same part is repeatedly detected, the detection error is prevented, and the pulse rate of the signal $S_3$ becomes large whereby the detection accuracy is improved.

Further, the irradiation of the excitation light a and the detection of the emitted light b or the afterglow b' are carried out on the same plane in perpendicular to the mark moving direction at certain angle, the enlargement of the width of the scanning beam is suppressed without using a slit to narrowing the light beam, and the length of the mark in the mark moving direction is accurately detected.

What is claimed is:

1. A detection mark comprising:
   a source of excitation light;
   a pattern formed from a thin phosphor layer which emits light having a different wavelength from that of excitation light from said source and irradiated on a surface side of said phosphor layer,
   an undercoat layer which is formed on a rear surface side of said phosphor layer and reflects said excitation light;
   said undercoat layer having a selected reflectance characteristic so as to provide a ratio of an output voltage obtained from detected light emitted from said phosphor layer to that of excitation light reflected from said undercoat layer which is at least 1.6;
   means for pulsing said source of excitation light to generate pulses of light emitted from said phosphor layer; and
   means for detecting and counting said pulses of emitted light to determine a width dimension of said phosphor layer.

2. The detection mark according to claim 1, wherein said phosphor layer has a thickness of from 0.5 to 200 μm, and said undercoat layer has a uniform reflectance profile.

3. The detection mark according to claim 1, wherein said phosphor layer has a thickness of from 0.5 to 200 μm and said undercoat layer has an uneven reflectance profile.

4. A method for detecting a mark, which comprises the steps of:
   irradiating an excitation light on a phosphor mark printed on a card, said mark being formed from a material having an afterglow property;
   pulsing said excitation light;
   moving said card relative to said excitation light;
   detecting pulses of afterglow from said irradiated material of said mark during an off time of said excitation light; and
   counting the number of pulses of afterglow to determine the width of said mark.

5. The method according to claim 4, wherein during said pulsing step the off time of said excitation light is shorter than the on time of said excitation light.

6. The method according to claim 4, wherein said irradiating and detecting steps are carried out in a shielded state, and said step of moving includes moving said mark from an irradiation side of said excitation light to a detection side of said afterglow.

7. An apparatus for detecting a phosphor mark, comprising:
   a pulsed source of excitation light;
   means for irradiating excitation light from said source on a mark being moved relative to said source of excitation light and comprising a phosphor layer, said phosphor layer thereafter emitting pulses of light in response to said excitation light;

means for selectively receiving and detecting said pulses of light emitted from a part of said mark irradiated by said excitation light;

said means for receiving and detecting being located adjacent said means for irradiating said excitation light;

means for counting said pulses of light emitted from said phosphor layer for detecting a width dimension thereof; and wherein optical axes of said means for irradiating said excitation light and said means for receiving and detecting said pulses of emitted light are located on a plane perpendicular to a direction in which said mark moves, said axes further being inclined relative to each other.

8. The apparatus according to claim 7, wherein said mark comprises a plurality of strips which are parallel with each other and perpendicular to a moving direction of said mark, said excitation light and said emitted light are in the infrared region with said emitted light having a different center wavelength from that of said excitation light, said means for irradiating excitation light comprises an optical guide of a predetermined length extending from an emitting surface of a light emitting element, and wherein said means for receiving said light includes an optical guide which is connected to a light-receiving surface of a light-receiving element through an optical filter.

* * * * *